United States Patent [19]

Annas, Sr. et al.

[11] Patent Number: 4,765,122
[45] Date of Patent: Aug. 23, 1988

[54] CONVEYOR

[75] Inventors: Dulin L. Annas, Sr., Hickory; Richard M. Teague, Taylorsville, both of N.C.

[73] Assignee: Anteg, Inc., Hickory, N.C.

[21] Appl. No.: 131,841

[22] Filed: Dec. 11, 1987

Related U.S. Application Data

[62] Division of Ser. No. 936,109, Nov. 28, 1986, Pat. No. 4,739,607.

[51] Int. Cl.[4] ............................................. B65B 53/02
[52] U.S. Cl. ...................................................... 53/442
[58] Field of Search ................ 53/442, 557; 198/465.1, 198/468.8; 414/101, 102

[56] References Cited

U.S. PATENT DOCUMENTS 1,262,271  4/1918  Schumaker .
4,468,165  8/1984  Kawasaki ............................ 414/417
4,552,260  11/1985  Teagno ............................... 198/345
4,671,402  6/1987  Inoue .................................. 198/465.3

FOREIGN PATENT DOCUMENTS 2444535  12/1978  France .
58-69606  10/1981  Japan .
59-114206  7/1984  Japan .

Primary Examiner—John Sipos
Attorney, Agent, or Firm—Roy B. Moffitt

[57] ABSTRACT

A conveyor system having first second and third stations and a return conveyor in communication with and linking the first and third stations: The first station has a device to selectively feed pallets, one at a time, from the return conveyor to a position underneath an unpackaged work piece disposed on the first station portion of the conveyor system and help position the pallet with the work piece on top of it on to another part of the first station portion of the conveyor system, which conveys the pallet and the work piece to the second station where packaging of the workpiece is carried out, for example, shrinking a plastic sheet about the work piece. Another part of the conveyor system conveys the packaged work piece to the third station where a device removes the pallet from the packaged work piece, places the packaged work piece on another part of the third station portion of the conveyor and places the pallet on the return conveyor for return to the first station.

10 Claims, 15 Drawing Sheets

CONVEYOR

BACKGROUND OF THE INVENTION

Related Applications

This is a division of U.S. Ser. No. 06/936,109, filed Nov. 28, 1986, entitled "Conveyor", now U.S. Pat. No. 4,739,607.

In the furniture industry, it is customary to package a piece of upholstered furniture (sometimes called a workpiece) by heat shrinking a heat shrinkable sheet of plastic about the workpiece. This is usually accomplished by draping a heat shrinkable plastic over the workpiece and then conveying the workpiece so draped into an enclosure(a furnace) where hot air (375° F.) is blown against the plastic, causing it to shrink to and take the shape of the outside contour of the workpiece. Usually this process employs a conveyor integral with the furnace. This conveyor conveys the plastic draped workpiece into and then out of the furnace. Most furnaces used for this purpose employ a conveyor at least a part of which is made up of a plurality of spaced apart members positioned transverse to the longitudinal path of conveyor travel. The space between the members is required to allow the hot air to enter the enclosure. Hot air comes from the bottom of the furnace (under the conveyor), then into the furnace proper where it comes in contact with the plastic, causing the plastic to heat shrink about the workpiece. Because of the spaced apart nature of these members, a problem is created.

A great deal of furniture, having legs or feet, (sofas, chairs, loveseats for example), is packaged by the heat shrinking method. This type of furniture must be first loaded on pallets, then the loaded pallets hand placed on the furnace conveyor. If the pallets were not used, the feet or legs would become lodged in between the transverse members of the furnace conveyor and cause problems. After the loaded pallet is moved through the furnace and the heat shrinkable plastic packaging of the workpiece is completed, the packaged workpiece must be conveyed to a position outside of the furnace and removed from the pallet. Additionally, the pallet must be removed from the conveyor and conveyed back to its point of origin for reuse.

The prior art teaches that all of these pallet-workpiece operations are to be carried out by hand. This is inefficient and dangerous. Workman must handle the hot, just-packaged workpiece immediately after it emerges from the furnace. Such a practice exposes the workman to burns, not to mention the risk of injury to the packaged workpiece itself. Workmen may also be injured when lifting the packaged workpiece and/or the pallet. This invention automates all facets of the previously-mentioned process, relieving the workman from touching the hot, just-packaged workpiece, lifting and conveying either the packaged workpiece and/or the pallets.

BRIEF DESCRIPTION OF THE INVENTION

The disclosed inventin is a conveyor system having first, second and third stations. In addition to these stations there is a return conveyor which is in communication with and links the first and third station. The first station has a device that feeds pallets, one at a time, from the return conveyor (a first level) to a position underneath an unpackaged workpiece disposed on the first station portion of the conveyor system and raises the pallet to a second level so that the workpiece is on top of it. Another part of the conveyor system conveys the pallet from the workpiece to a second station (a furnace) where packaging of the work piece takes place. This packaging is accomplished by heat shrinking a plastic sheet about the workpiece. After packaging, the packaged workpiece is then placed on another part of the conveyor system which conveys the packaged workpiece to a third station. At the third station, there is a device that removes the pallet from the packaged workpiece, (moves it from the second to the first level), places the packaged workpiece on another part of the third station portion of the conveyor and places the pallet on the return conveyor (first level) for return to the first station.

DETAILED DESCRIPTION OF THE INVENTION

Figure 1:
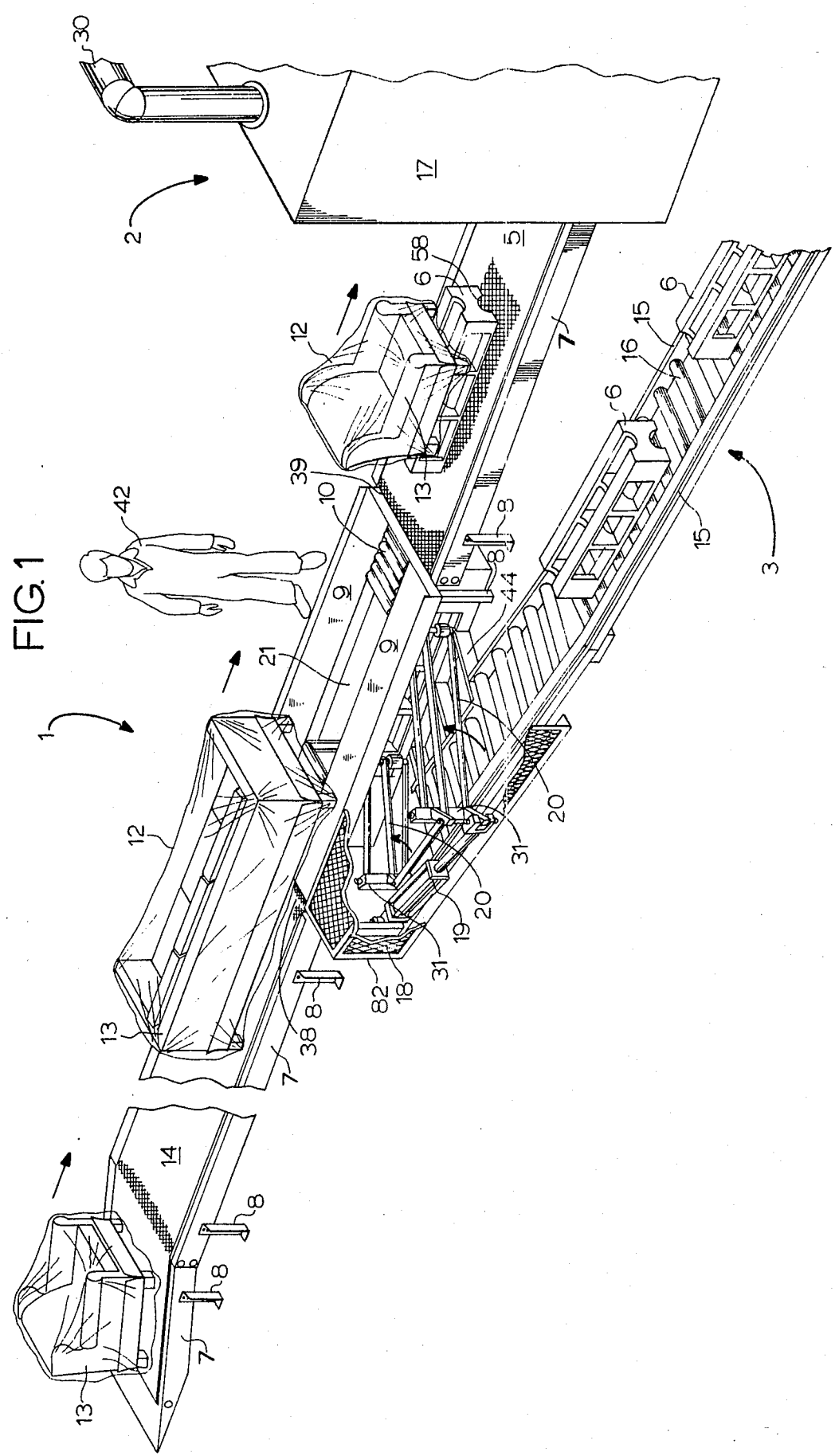
FIG. 1 is a perspective view of the first portion of the conveyor system of the invention.
Figure 2:
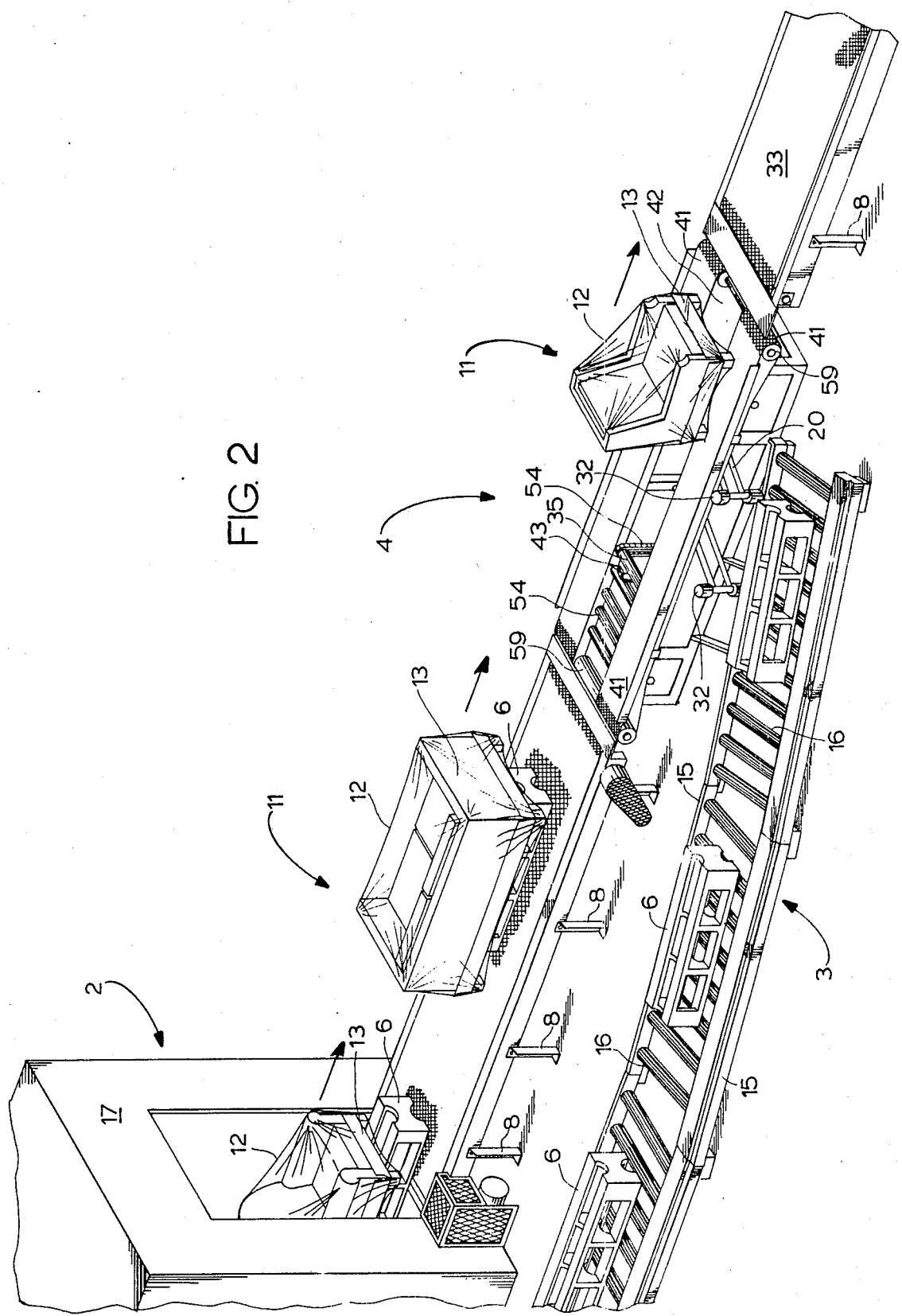
FIG. 2 is a perspective view of a second portion of the conveyor system of the invention, FIGS. 1 and 2 being contiguous to one another.

A general understanding of the entire conveyor system can be achieved by viewing FIGS. 1 and 2. FIG. 1 is a generalized prospective view of all of the first station and part of the second station of the invention. FIG. 2 is a generalized perspective view of a part of the second and all of the third station of the invention. FIGS. 1 and 2 when viewed in a continuous manner, present a general description of the invention in pictorial form.

Element 1 of FIG. 1 represents the first station and element 2 of FIG. 1 identifies the second station of the invention. Element 4 of FIG. 2 represents the third station of the invention. All of these are disposed generally at a second level. Portions of elements 1 and 4 are adapted to be moved to other levels as will be later described. It will be noted that the entire invention is a conveyor system comprising elements 1, 2, 3, and 4. Element 3 of FIGS. 1 and 2 is disposed at a first level and is a return conveyor, linking and communicating with the first and third station. The first level is lower than the second level, the second level represented by the position of frame 26 of FIG. 4. The primary purpose of return conveyor 3 is to return pallets 6 from station 4 to a position just out by, but not under, station 1. Rollers 16 of return conveyor 3 (first level) are coplaner with rollers 22 of frame 23 when frames 23 and 26 are in position shown by FIG. 3. Station 1 is a conveyor made up of legs 8 on which frame 7 is attached. Disposed on frame 7 is a continuous belt type conveyor 14 (well known in the prior art) that terminates at a point denoted by element 38 and is at the second level.

Figure 3:
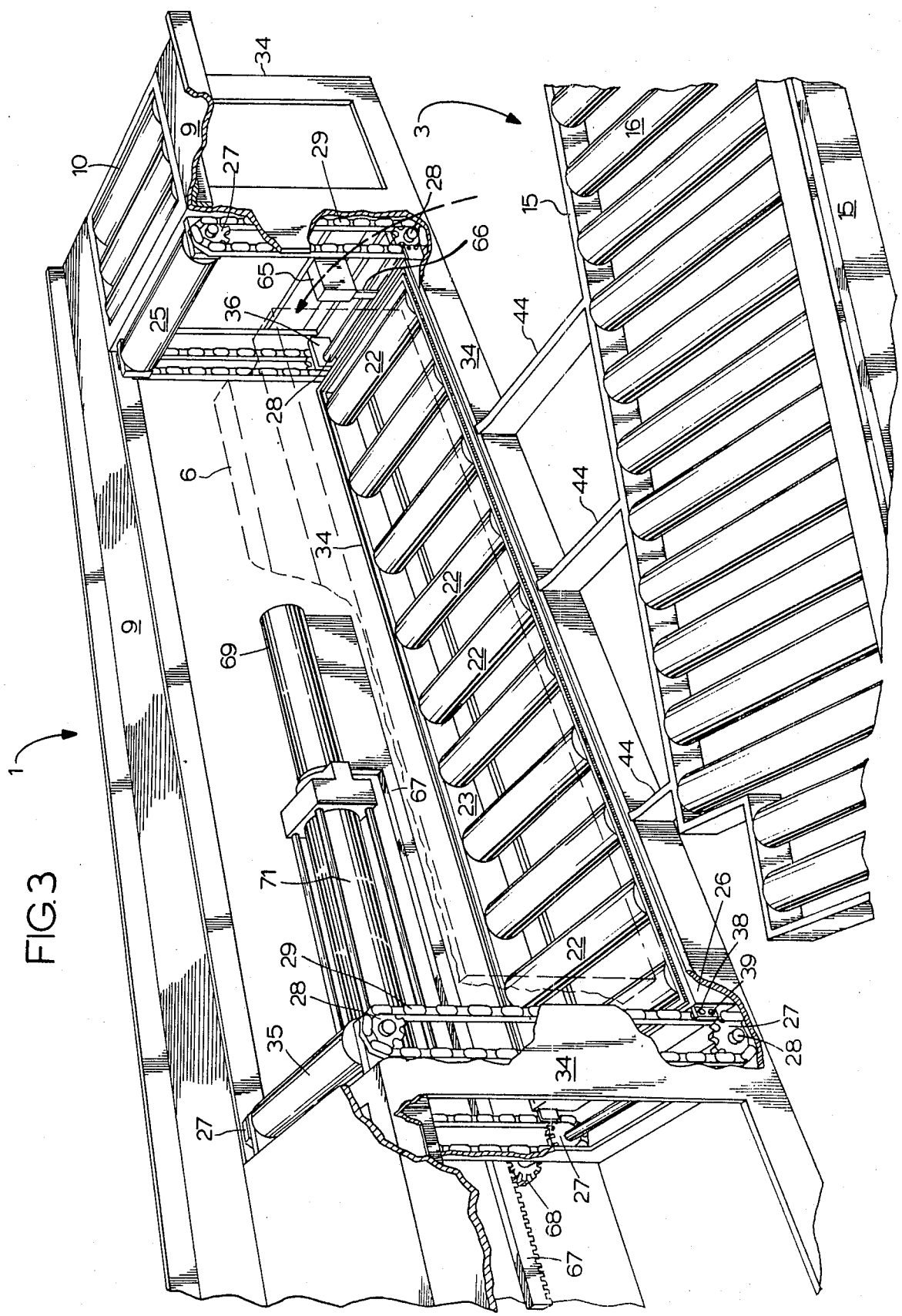
FIGS. 3, 4, and 5 are perspective partial views of the first (loading) station of the invention showing a portion of the first station at its first level (coplaner with return conveyor), second level (coplaner with upstream and downstream conveyor), and third levels respectively.
Figure 6:
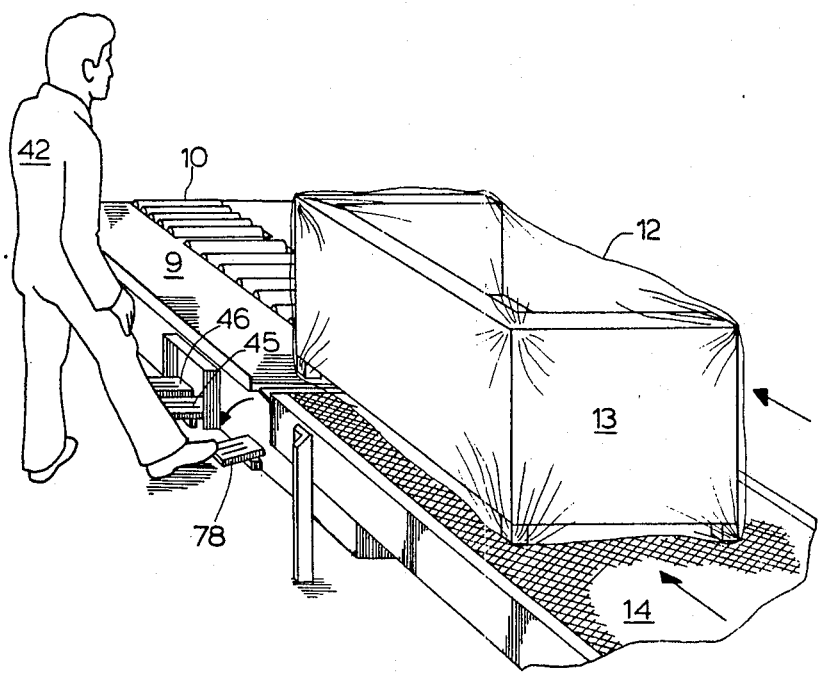
FIGS. 6, 7, 8, 9, 10 and 11 are pictorial perspective views of the manner the apparatus of FIG. 1 (first station) may be used to position, raise, dress, turn (rotate) and lower a workpiece prior to packaging same.
Figure 7:
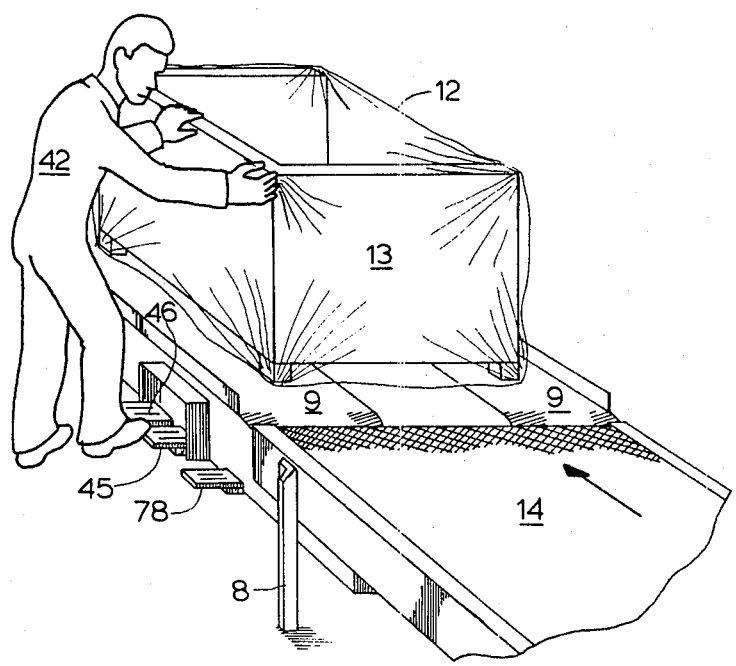
Figure 8:
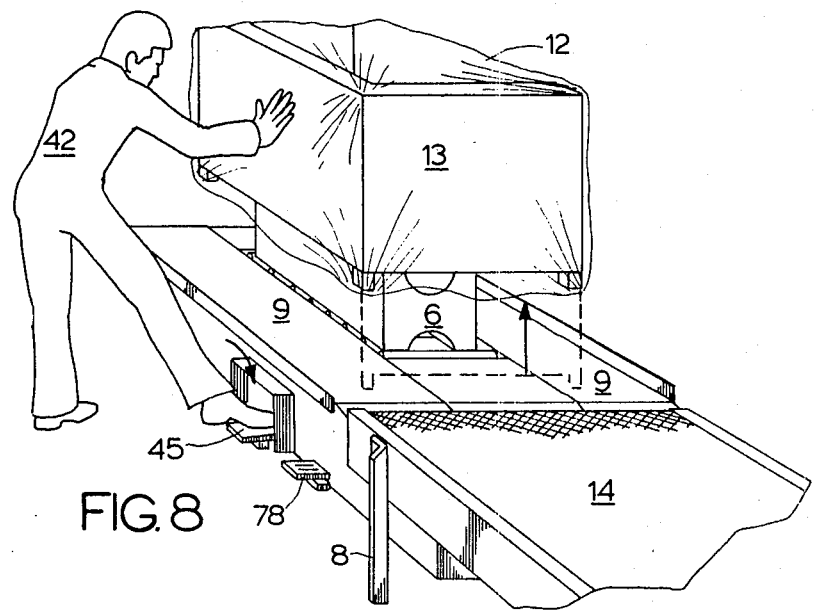

That portion of station 1 delimited by and in between point 38 and a point denoted by element 39 contains a device for disposing pallets 6 underneath workpieces 13 over which heat shrinkable plastic 12 has been draped. Pallet 6—disposed on return conveyor 3 (more particularly rollers 16) in a manner that will be hereinafter described in more detail—is moved from return conveyor 3 by arms 20 onto rollers 22 (see FIG. 3), while such rollers are in the first level position as shown in FIG. 3. A workman 42 then operates means 78 (an on-off switch) to stop the conveyor system and if necessary hand positions the plastic draped workpiece (elements 12 and 13) over frames 23 and 26. See FIGS. 6 and 7. After positioning the workpiece, the forward most position of pedal 46 (an on-off switch) is depressed causing frames 23 and 26 to be driven by a lifter (a hydraulic and a gear system) from level two to level one where they are now ready to be loaded with a pallet 6. When frames 23 and 26 reach level one they stop but with power still on them, biasing them downward. When frame 23 reaches level one it strikes time delay switch 65, which causes gate members 20 to extend removing a single pallet from return conveyor 3 and placing it on frame 23. Striker plate 114 strikes on-off switch 104 (FIGS. 19 and 20) when so extended, causing arm 20 to retract.

Figure 16:
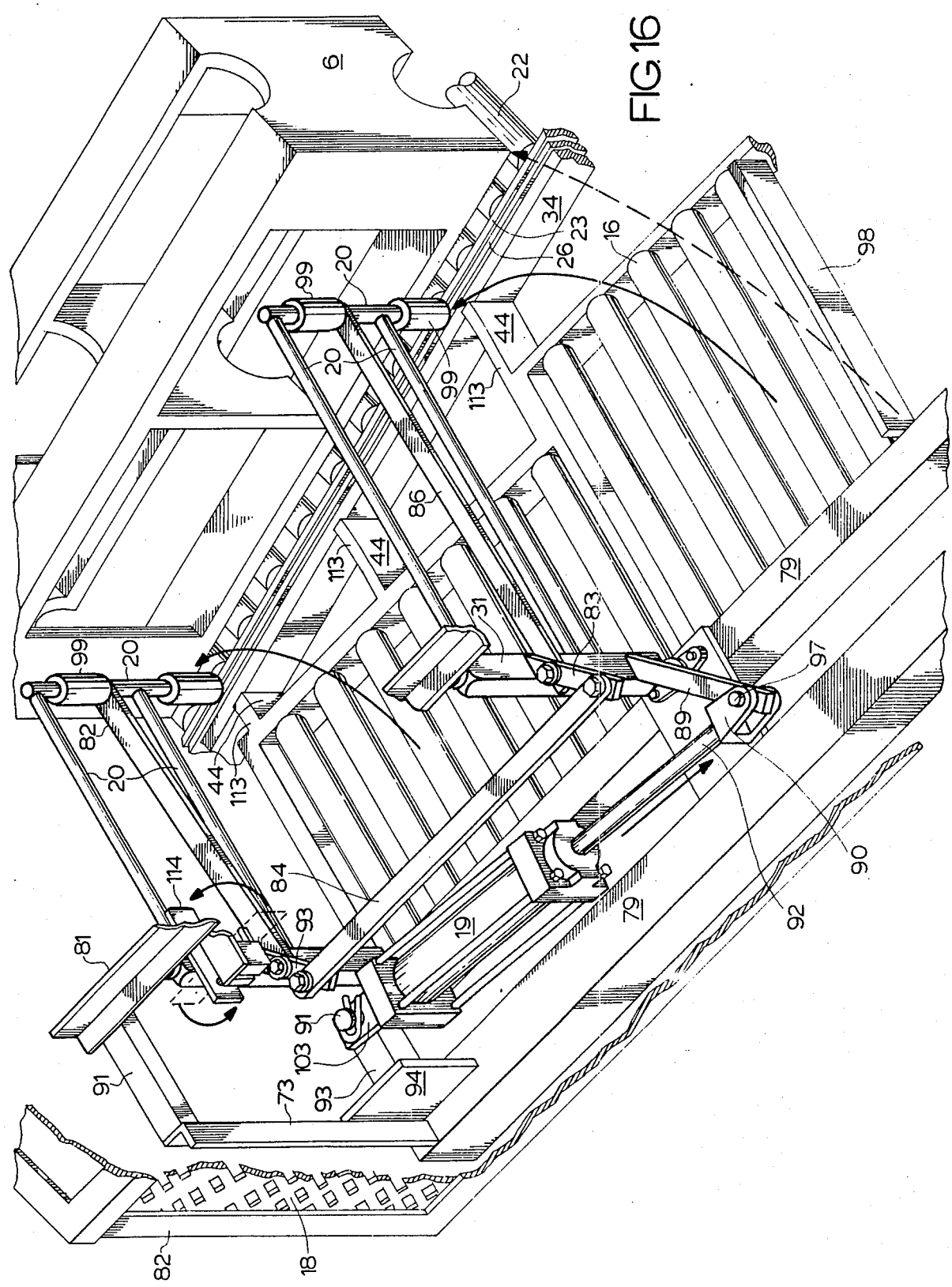
Figure 21:
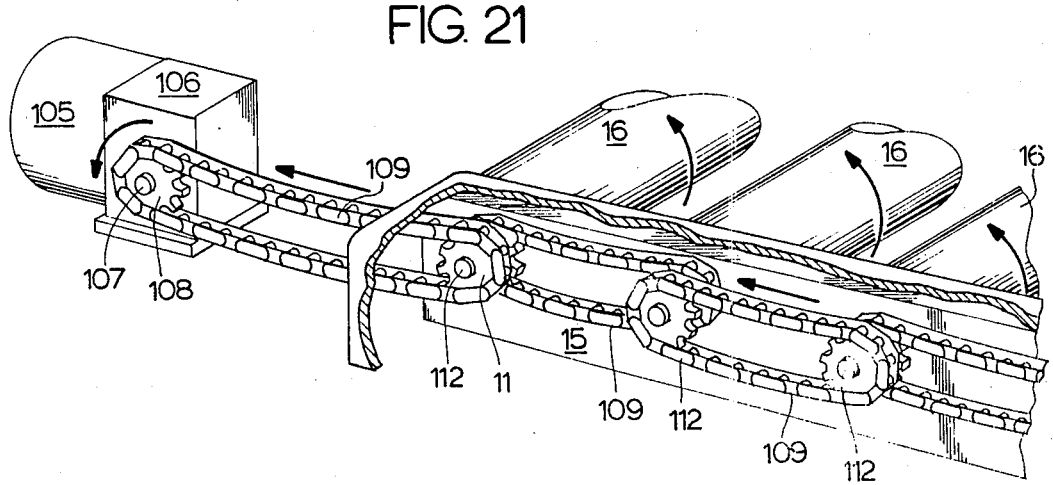
FIG. 21 is a perspective partial view of the powering apparatus used to rotate rollers 16 of return conveyor 3.

Retraction of gate member 20 causes striker plate 114 to activate another time delay switch 60 that causes stop member 98 (see FIG. 16) to be depressed a predetermined length of time so as to allow another pallet 6 to be moved upstream on conveyor 3 to a position alongside frames 23 and 26, ready for the next reload. Stop member 98 then goes to its upright position shown in FIG. 16, presenting further movement of pallets 6 toward station one. Rollers 16 are continuously powered as shown in FIG. 21. Subsequently, the rearward most terminal position of pedal 46 is depressed causing the first mentioned hydraulic system to be driven in a reverse direction to raise frames 23 and 26 from level one to level two. A more detailed description of station one apparatus to carry out this pallet transfer will be explained later.

If the heat shrinkable plastic 12 draped over workpiece 13 needs no further "dressing up", the workpiece and pallet combination is then moved on to conveyor 5 by a station one workman 42. Usually the terminal portions of the heat shrinkable but not yet heat shrunk plastic 12 needs to be "dressed up," i.e. tacked or otherwise affixed to the bottom portion of the workpiece 13. In this event, the workpiece draped with the heat shrinkable plastic needs to be raised to a third level so that the workman can accomplish this task. See FIGS. 9 and 10.

Figure 4:
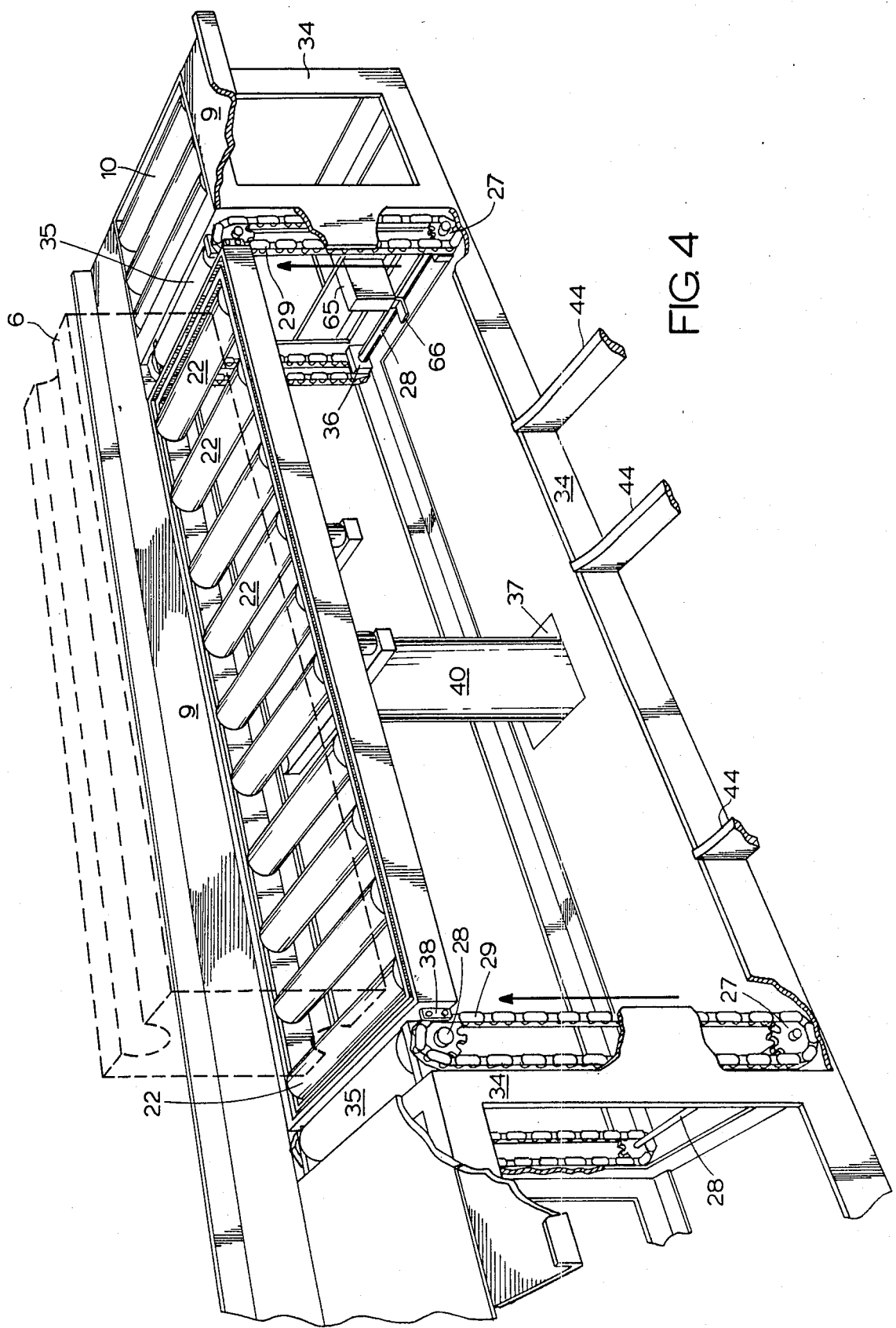
Figure 5:
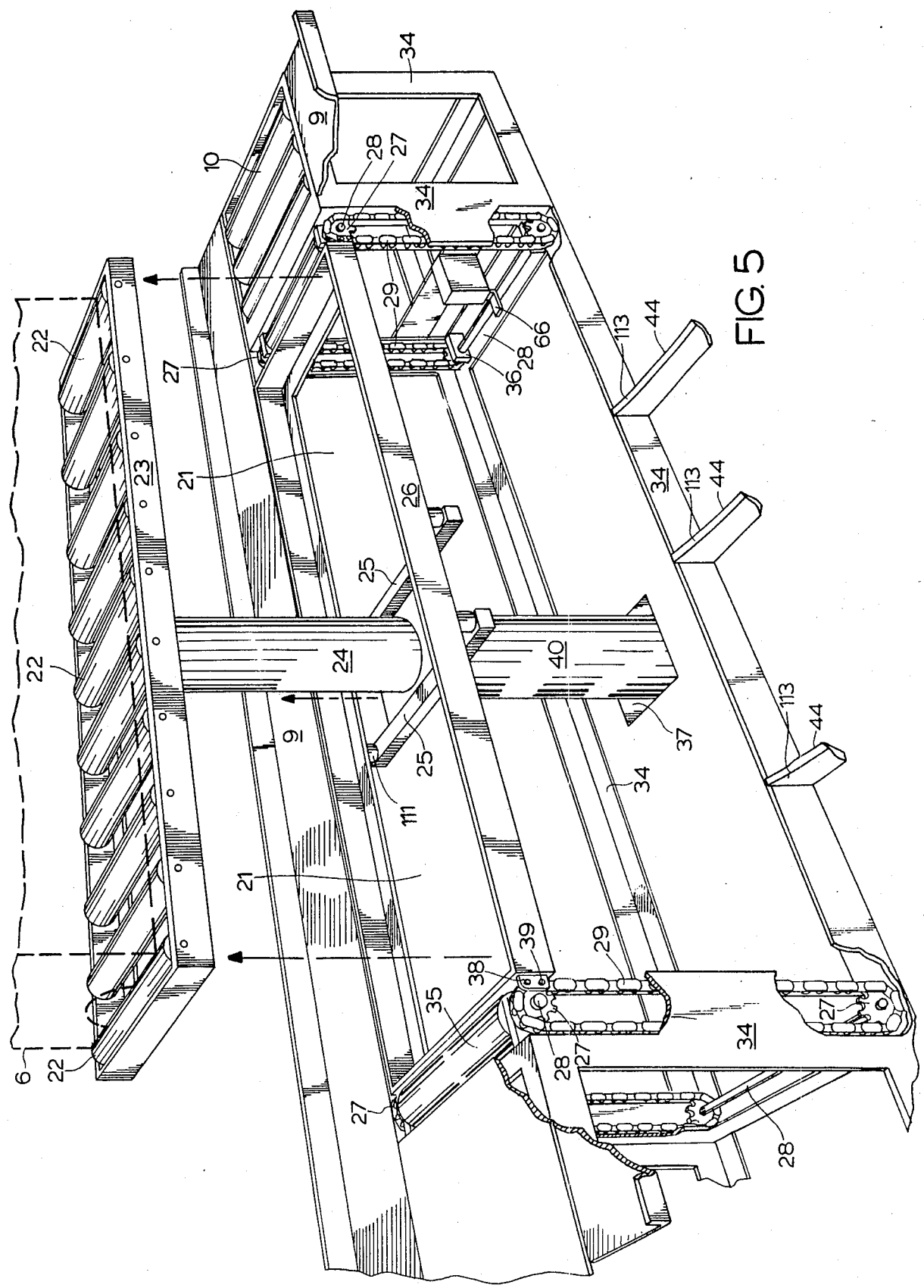

Shown in FIG. 5 is frame 23 and rollers 22 in their raised position: at the third level. This third level is higher than the previously identified first and second levels and makes it easy for a workman with a stapling gun to tack or affix the terminal portions of yet-to-be shrunk heat shrinkable plastic 12 to the underside of workpiece 13. After this operation is completed, pedal 45 is actuated and frame 23 and rollers 22, along with its pallet 6, workpiece 13, and heat shrinkable plastic 12 disposed thereover is lowered again to that position as shown in FIG. 4 where rollers 22 and 35 are coplaner: the second level. Then pallet 6, workpiece 13 and heat shrinkable plastic 12 is rolled onto conveyor 5 to begin its journey through furnace 17. The procedure just described is shown in FIGS. 6, 7, 8 and 9. Note workman 42 and stapling gun 47. When one end of two way pedal 45 is depressed a hydraulic device (not shown) is activated that raises cylinder 24, frame 23, pallet 6 and its load (elements 12 and 13) from the second to the third level. See FIG. 8.

Figure 9:
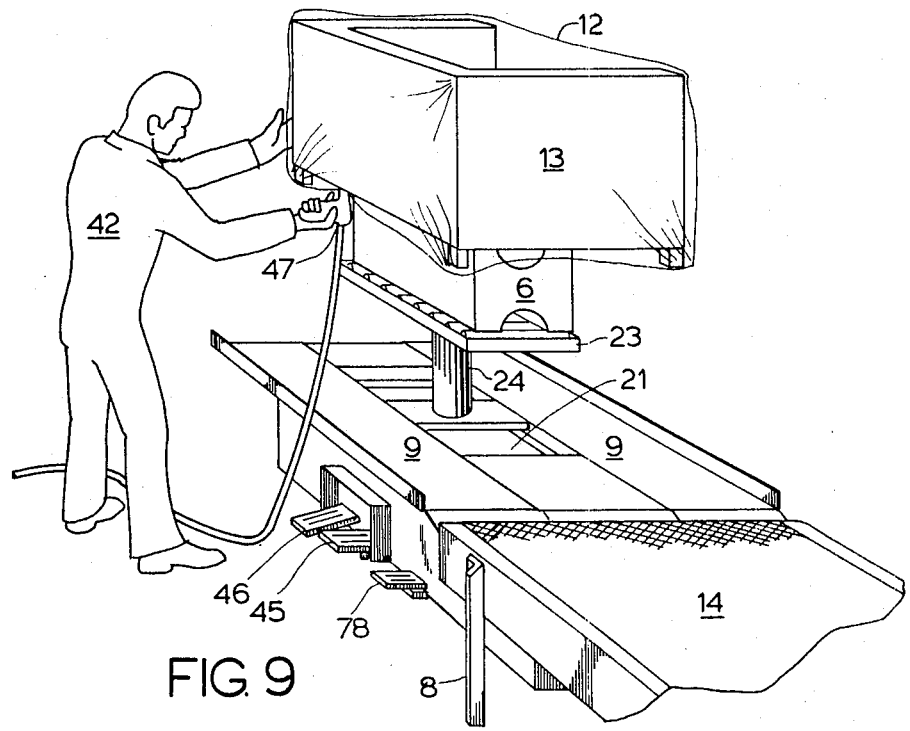

Shown in FIG. 9 is a third pedal 78 connected to a power source (not shown) for driving conveyor belt 14. By moving pedal 78, conveyor belt 14 is activated until a plastic 12 draped workpiece 13 on pallet 6 is positioned over opening 21 ready to receive pallet 6 on its under side. Then it is manually deactivated. Then pallet 6 and workpiece 13 is then raised up to a third level by activating pedal 45 and the procedures shown in FIGS. 9 and 10 respectively are carried out. Afterwards, the draped workpiece is lowered from level three to level two by manually activating pedal 45 (see FIG. 11). Afterwards, pedal 78 is manually activated, causing conveyor 14 to move until another plastic 12 draped workpiece 13 is likewise positioned over opening 21.

Pushing pedal 45 on its forward terminal position sends frame 23 from its second to a third (higher than the second) level. Pushing pedal 45 on its rearward terminal position sends frame 23 from its third to its second level. Pushing downward on pedal 78 starts the conveyor system. A reverse motion stops the conveyor system.

Figure 10:
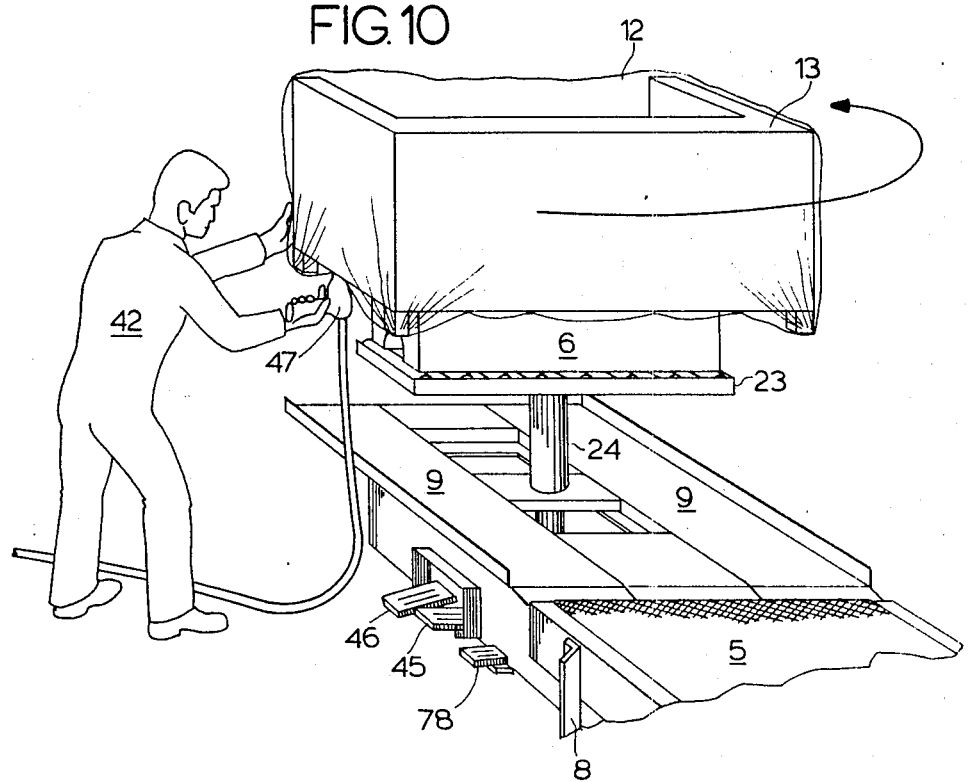
Figure 11:
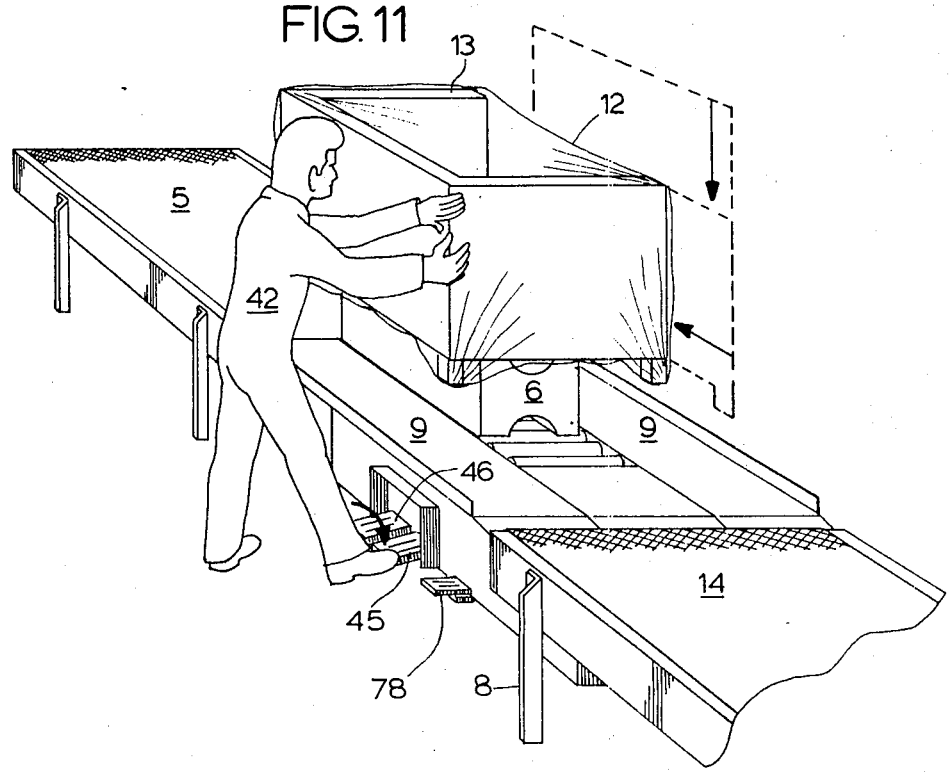

Conveyor 14 (a prior art conveyor) is disposed between lateral frame members 7 and terminates at a point identified by element 38. Conveyor 14 drives draped workpiece 13 onto guide members 9 positioned on both lateral sides of opening 21. Disposed inside of opening 21 is frame 26 into which frame 23 is removably received. On the terminal portions of frame 26 are tabs 38 (FIG. 4), affixed to chain 29 by means of fastening means 39. Chain 29 is threaded over sprockets 27 and 28 and driven by a power means (not shown). Sprockets 27 are affixed to axles 28, which is journaled in bearings 36. A workman can activate a hydraulic power, gear means (see for example, elements 67, 68, 69 and 71 of FIG. 3 which operate in the same manner as elements 100, 71, 70, 69, 67 of FIG. 14) via pedal 46 to drive axle 28 to cause frame 26 (along with frame 23 and rollers 22 therein) to be moved from that position (second level) shown in FIG. 14 (rollers 22 coplaner with rollers 10) to that position (first level) shown in FIG. 3 (rollers 22 coplaner with rollers 16). Once frame 23 is driven to level one, transfer arms 20 are activated to move a pallet 6 onto frames 23 and 26. Subsequently, frames 23 and 26 are returned to level two. Assuming that some "dressing" needs to be done to the bottom terminal portions of heat shrinkable, but not yet shrunk plastic 12, an operator can activate pedal 45 to cause cylinder 24 to extend frame 23 and rollers 22 to the upward position (third level) as shown in FIGS. 5, 9, and 10. Activation of pedal 45 lowers cylinder 24 from that position (third level) shown in FIGS. 5, 9 and 10 to that position shown in FIG. 4 (second level) where rollers 22 are coplaner with rollers 10 and 35.

Referring to FIGS. 3 and 4, the lifter shown in these figures that performs the function of moving frames 23 and 26 from level one to level two and from level two to level one is constructed of a frame 34 to which journal bearings 36 are affixed. Axle 28 is journaled in bearings 36 and affixed to sprocket 27. Chain 29 is threadedover sprockets 27 and is affixed to frame 26 by means of tab 38 and fastening means 39. Frame 26 is made of angle iron thereby allowing frame 23 to be removably received therein. The movement of frame 26 from a first (FIG. 3) to a second (FIG. 4) level also moves frame 23 (and rollers 22 affixed thereto) in a like manner. Sprockets 27 and axles 28 are rotated by rack and pinion gear element at station one—see elements 67 and 68 of FIG. 3, remembering that they operate like elements 67 and 68 of FIG. 14—the operation of which is explained later in connection with the description of the third station.

Cross members 25 are affixed to the bottom portion of frame 26 by upstanding members 111. Cylinder member 24, powered by a prior art hydraulic means (not shown), is coaxially received inside of cylinder 40, both of which are received in aperture 37 of frame 34 and is used to move frame 23 from the second to the third and from the third to the second level. Because cross members 25 are also affixed to frame 26 they provide a means for moving tube 40 from that position shown in FIG. 5 to that position shown in FIGS. 3 and 4.

Rollers 10 (see FIGS. 3, 4, and 5) are not powered and are journaled in lateral terminal portions of frame member 9. These rollers facilitate the movement of workpiece 13 onto conveyor 5. Conveyor 5 is disposed on frame 7 supported by legs 8 and is part of the second station 2.

Station 2 is known prior art; thus, no detailed description of its structure will be made. In essence, it consists of a furnace 17, ingress and egress conveyors 5, a source of hot air (not shown) and a spent air exhaust system 30. There is another conveyor (not shown) inside of the furnace housing 17 composed of a plurality of slats (not shown) disposed transverse to the directional arrows shown in FIGS. 1 and 2. These slats are spaced apart and are basically tubes that have a rectangular cross section. The spaced apart nature of the slats or tubes is a requirement so that hot air may be forced into the furnace 17, such being done underneath the tubes and workpiece 13 with its plastic covering 12. The entering hot air is approximately 375° F. When the draped workpiece comes in contact with this hot air, the heat shrinkable plastic 12 shrinks over and conforms to the outside contours of workpiece 13. The emerging packaged workpiece 11 is transported from conveyor 5 onto spaced apart conveyors 41 delimiting open space 42. Packaged workpiece 11 then travels in the direction of the directional arrow (unnumbered) until it hits a limit switch 50 (FIG. 14), thereby stopping the motion of conveyors 41. At this time pallets 6 are removed from underneath the packaged workpiece and disposed, by means of arms 20, onto return conveyor 3 to be transported back to the first station 1. Details of these steps and apparatus to achieve same will be described later.

Return conveyor 3 is a conveyor comprising roller members 16, rotatively journaled in spaced apart frame members 15, positioned at a first level and is affixed to the first station 7 by means of cross members 44. Roller members 16 are powered (continuously) by that apparatus shown in FIG. 21, so as to return pallets 6 from the third station 4 to the first station 1. Rollers 16 have axles 112 affixed to sprockets 11 which are threaded over drive chains 109, one of which is threaded over sprocket 108 affixed to axle 107 of gear 106. Motor 105 drives gear 160 and thus rollers 16.

After pallet 6 is removed from the packaged workpiece 11, packaged workpiece 11 is then transported by spaced apart conveyor belts 41 onto conveyor 33 and thence to storage or other disposition.

Figure 12:
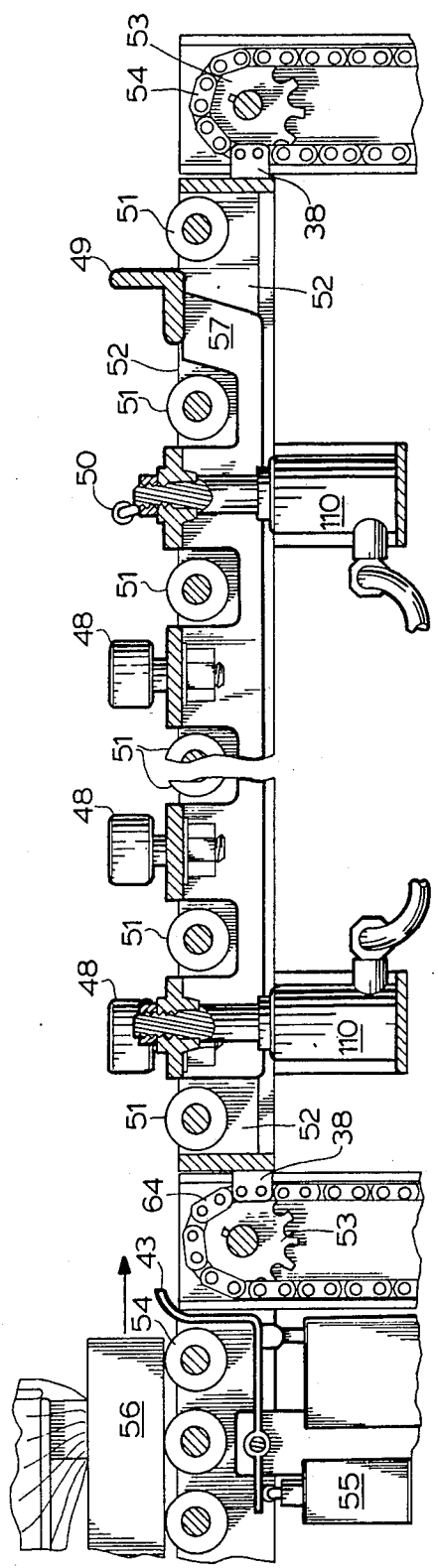
FIGS. 12 and 13 are partial side elevations of third station unloading apparatus.
Figure 13:
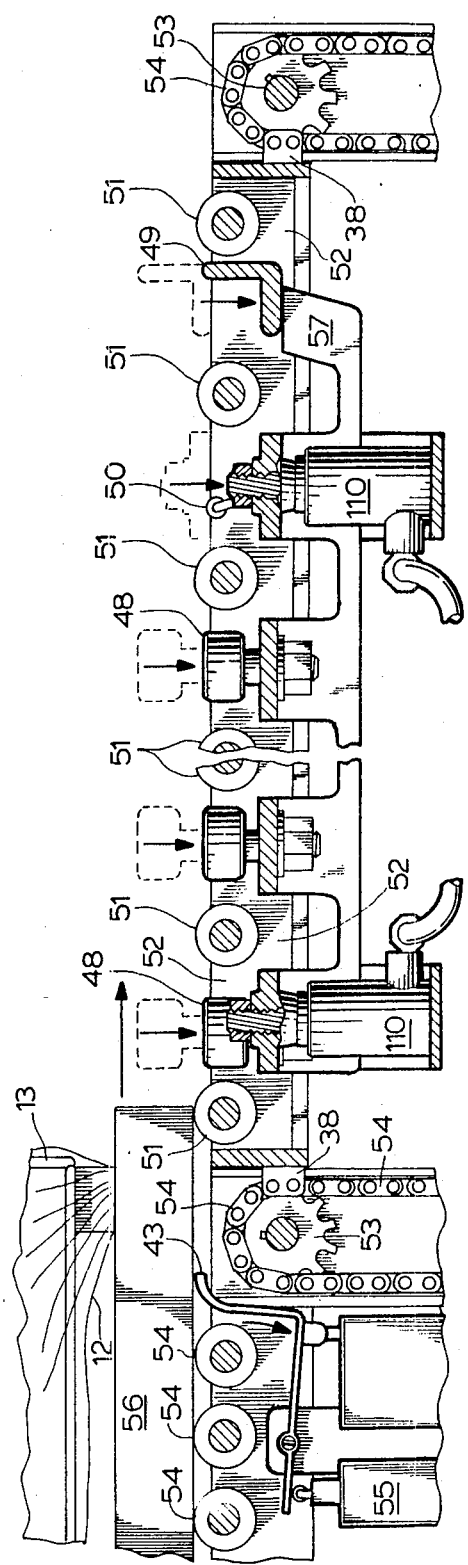

Element 4 of FIG. 2 denotes the third station, similar in structure and operation to the structure and operation of the first station. A comparison of FIGS. 1 and 2 shows this similarity. Spaced-apart conveyor belts 41 disposed on rollers 59 form opening 42 somewhat similar to opening 21 of element 1. Disposed in opening 42 is frame 57. Removably received inside frame 57 is frame 52. Rollers 51 are rotatively attached to frame 52. Frame 57 (along with its attached rollers 48) is adapted to be moved from that position shown in FIG. 12 to that position shown in FIG. 13 and the reverse. Non-powered upstanding rollers 48 affixed to element 57 are adapted to be rotated around their vertical axis. There are two spaced apart rows of rollers 48 disposed along the longitudinal axis of frame 57, adapted to fit inside of that space delimited by aperture 58 of pallet 6. Pallet 6 is discharged from conveyor 5 (see FIG. 2) onto conveyor belts 41 and does so with frame 57 in the position shown in FIG. 12, its normal position. Rollers 48 are adapted to be "threaded" inside of pallet aperture 58 and in rolling contact with the under side of pallet 6 to position it on rollers 51 in a predetermined position so that pallet 6 can be subsequently removed from the packaged work piece 11 and disposed on return conveyor 3 as shown in FIG. 2. This removable function will be more fully described at a later time.

There are times, however, when a pallet with an aperture 58 is not desirable and only a box or solid pallet 56 is desired. In this case, pallet 56 strikes goose neck arm 43 which in turn activates time delay switch 55 like that disclosed in U.S. Pat. No. 4,553,999. Time delay switch 55 then activates a lifter (hydraulic cylinders 110) causing frame 52 to move from that position shown in FIG. 12 to that position shown in FIG. 13 and dwell in the last mentioned position for a predetermining length of time. After expiration of this predetermined time (preset in switch 55), hydraulic cylinders 110 move frame 57 from that position shown in FIG. 13 to that position shown in FIG. 12. The predetermined length of time is that amount of time it would take box 56 to clear all of the rollers 48, i.e., its trailing extreme left free edge clears the most rightward roller 48 of FIGS. 12 or 13. In such a case, box or pallet 56 rolls on rollers 51 from that position shown in FIG. 13 to the right and onto the rightward terminal portion of conveyor belt 41 as shown by the most rightward element 11 of FIG. 2.

Figure 14:
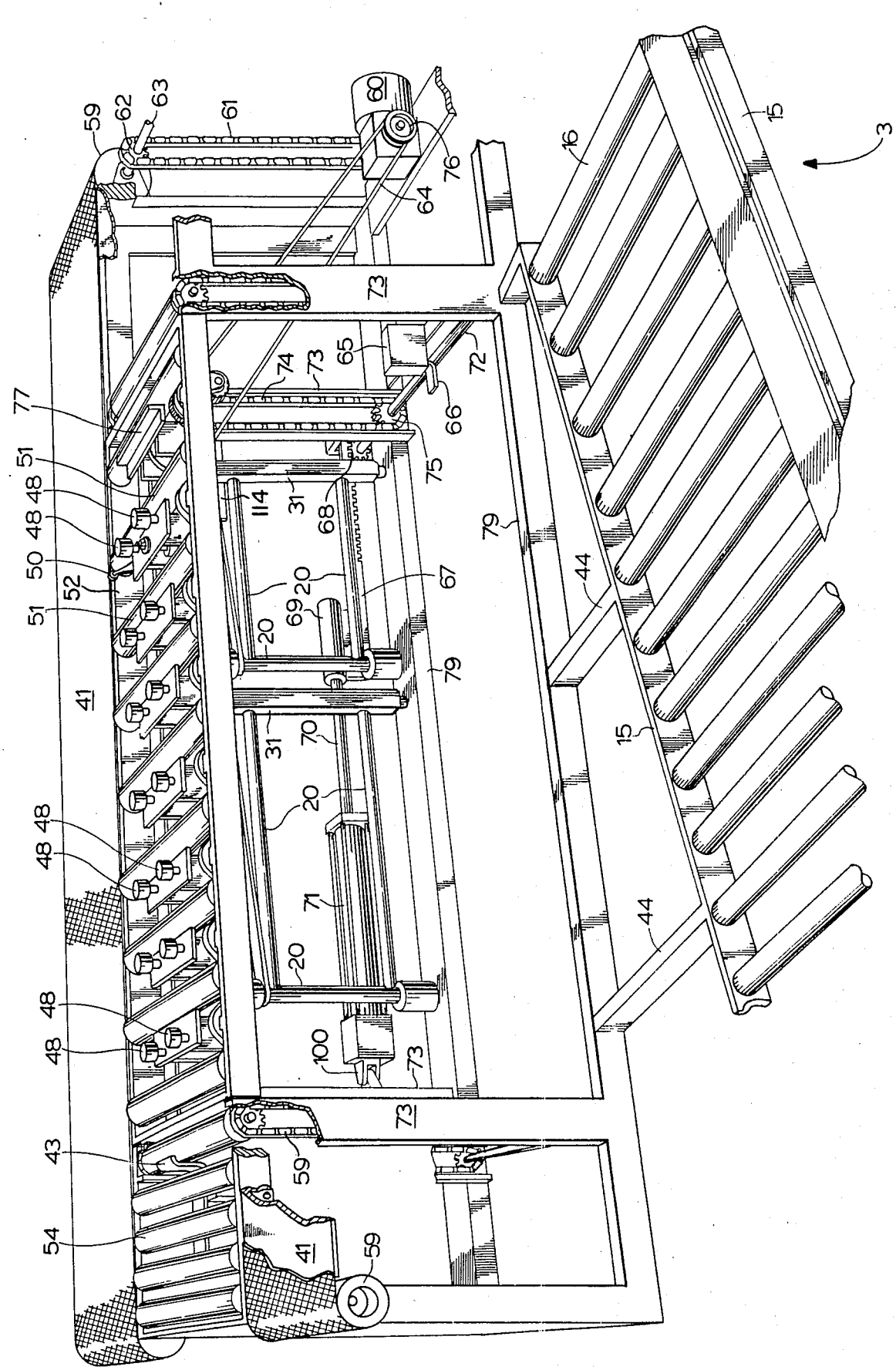
FIG. 14 is a perspective partially cut-a-way side view of the apparatus of the third (unloading) station of the conveyor system.

In the event that pallets 6 with aperture 58 are used, goose neck arm 43 then passes through aperture 58 untouched and time delay switch 55 is not activated. After passing over (and not activating) goose neck arm 43, pallet 6 comes in contact with and activates limit "on-off" type switch 50. Limit switch 50, when activated, stops conveyor belts 41 and activates a power means (not shown). This power means moves another lifter that causes sprockets 53 and 75 to rotate in a given direction lowering frame 52 and pallet 6 from its second level to its first level so that rollers 51 are coplaner with rollers 16 of return conveyor 3. This lifter is a hydraulic system and a gear system. It will be noted that chains 54 are threaded over sprockets 53 and are attached to frame 52 by means of tabs 38. Frame 52 remains at this first level until pallet 6 is removed from rollers 51 by arms 20 and deposited on rollers 16 of return conveyor 3. Such removal causes limit switch 50 to return to its normally "off" position, as shown in FIG. 14.

Transfer arms 20 at the third station pivot about upright members 31 journaled in frame 79 and performs two functions: (a) pushes pallet 6 from rollers 51 onto rollers 16 while both are coplaner with one another (at the first level) and (b) activates time delay switch 60 by striker plate 114 on arm 20. Throughout this specification the term time delay switch means a switch as described in U.S. Pat. No. 4,553,999, the contents of which are incorporated herein by reference as if it were faithfully reproduced therein. Time delay switch 60 is so "timed" that after activation and it "times out" it causes the lifter (the hydraulic cylinder and a gear system) to drive frame 52 from the first level to the second level, i.e., to that level shown in FIG. 14. At this level, tension on belt 64 is restored (power is removed when frame 52 and 57 are lowered from level two to level one) to rollers 51, and the conveyor system is ready for another workpiece.

When switch 50 (an on-off switch) is activated it activates the fluid in cylinder 71 that drives piston rod 70 that drives rightwardly rack gear 67 that rotates pinion gear 68 that drives sprocket 75 that drives chain 74 that, in turn, drives frames 52 and 57 from level two to level one, that position where rollers 51 are coplaner with rollers 16 of return conveyor 3. Piston arm 70 is attached to a fastening device 69 which is fastened to rack gear 67. Pinion gear 68 is in mesh relationship with rack gear 67 and is also affixed to axle 72, the terminal portions of which are journaled in upstanding members 73.

Switch 50 is an on-off switch. Pallet 6 activates switch 50, which activates a power means (not shown), that drives the fluid in cylinder 71. Such power is continuously applied until pallet 6 is removed at the first level. After pallet 6 is removed, switch 50 moves to its normally off position shown in FIG. 13. After rack gear 67 has reached the limit of its rightward travel (rollers 51 will be at the first level, coplaner with rollers 16) second transfer arms 20 (there are first transfer arms 20 at the first station) are activated to remove pallet 6 from rollers 51 to roller 16. When frames 57 and 52 are lowered to the first level they strike arm 66 of time delay switch 65. As soon as frames 52 and 57 begin their descent, the tension in belt 64 is reduced removing drive power from rollers 51. Drive power comes from motor 60, pulley 76, belt 64, pulleys 102 and belt 101. Belt 64 is attached to motor 60 through pulley 76 and is further threaded so as to power rollers 51. See element 102 (roller) and 101 (drive belt). Note stop means 77 which acts as a means to stop pallet 6, notwithstanding the power on rollers 51 prior to moving tension from 64 to cease rotation of same.

After time delay switch 65 of the third station is activated, a power means (not shown) attached to hydraulic cylinder 19 (FIGS. 17 and 18) is energized. Hydraulic cylinder 19 is connected to two second transfer arms 20 comprising two gates. Activation of switch 65 causes rod 92 of hydraulic cylinder 19 to extend and retract to move second transfer arms 20 from a retracted first (see FIG. 12) to an extended second (See FIG. 18) position. Extension of arm 20 causes striker plate 114 to activate switch 104 resulting in the reverse, i.e., movement of second transfer arms 20 from their extended second to their retracted first position. After retraction, time delay switch 60 is activated causing a signal to be sent to the power means of cylinder 71. At this state, rod 70 is in its most extended position with rack 52 and 57 at the first level. A reverse operation takes place, i.e., cylinder 71 cause rod 70 to move to the left (retracts) thereby raising frames 52 and 57 to the second level where rollers 51 are coplaner with roller 16, as shown in FIG. 24.

There is a critical relationship between on-off switch 50 and time delay switch 60 and 65. Only after switch 50 is deactivated (in its off position) will time delay switch 65 respond to one of its intended functions, i.e., driving piston rod 70 to the left to lift frames 52 and 57 from the first to second level. This is necessary because frames 52 and 57 (like frames 23 and 26) must be held down (maintained at the first level) until second transfer arms 20 clear pallet 6 from rollers 51 to rollers 16 of return conveyor 3. Otherwise havoc would result. The act of clearing pallet 6 causes switch 50 to return to its normal off position. After switch 50 is returned to its off position (while frames 52 and 57 are at the first level) time delay switch 60 then begins its timed activation of hydraulic cylinder 71 and its associated gear system to raise frames 52 and 57 from the first to the second level. See FIG. 14.

Figure 15:
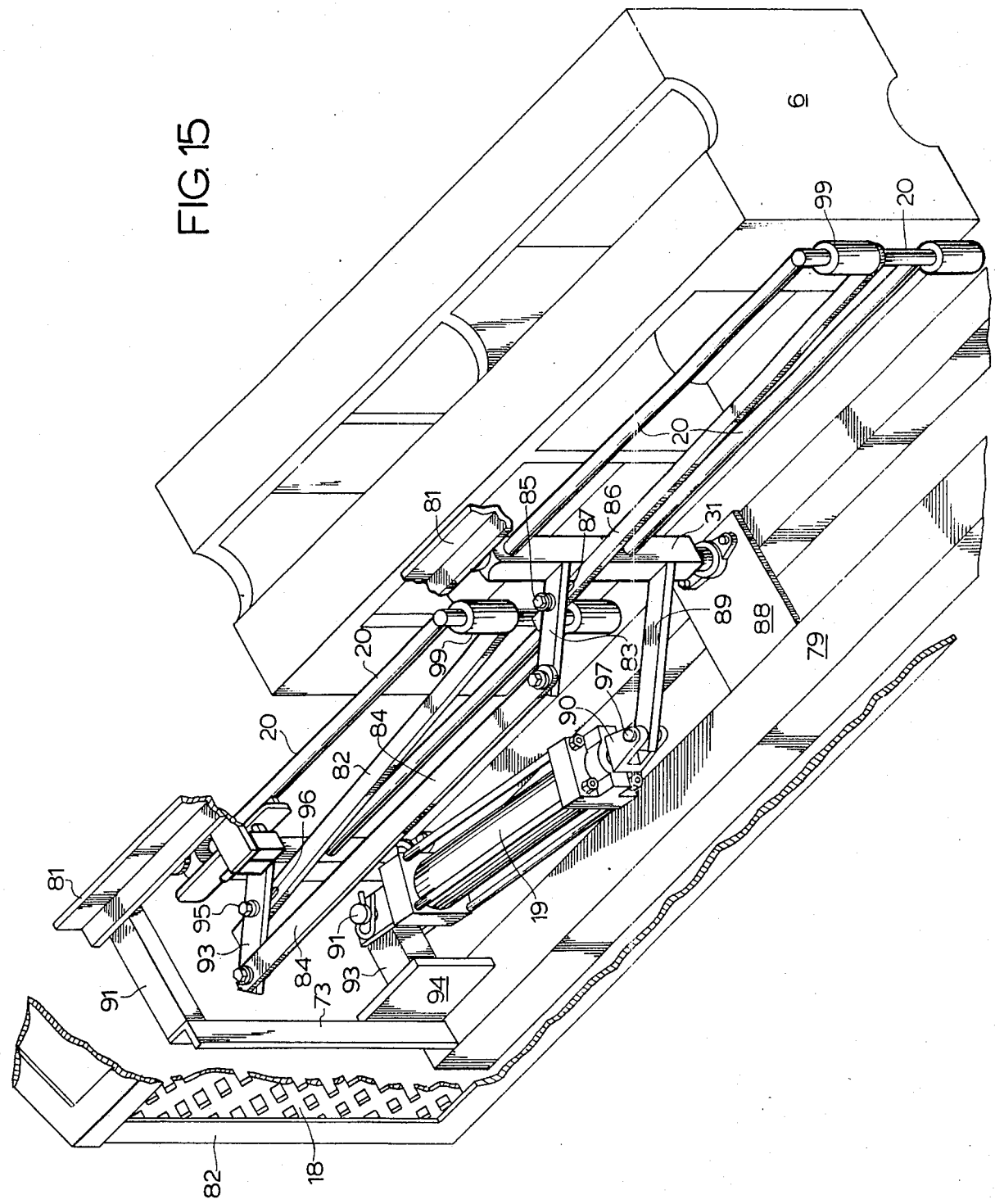
FIGS. 15 and 16 are perspective partially cut-a-way views of the apparatus of the first (loading) station of the conveyor showing the transfer of a pallet from the return conveyor (second level) to the first station of the conveyor system while a portion of the conveyor system at the first station is at the second level.

Reference is now made to FIGS. 15 and 16, which depict the first transfer arms (at the first station) in their first (retracted) and second (extended) positions respectively. Upright member 94 is attached to frame 79 and to support block 93. Yoke 91 is rotatively attached by pin 91 to support bock 93 and forms an integral part of hydraulic cylinder 19. Hydraulic cylinder 19 has a piston rod 92 attached to yoke 90. Yoke 90 is pivotally attached by pin 97 to arm 89. Arm 89 is fixedly attached to upright gate member 31. Upright gate member 31 and arms 20 comprise the main components of the first transfer arm. Upright gate members 31 are rotatively journaled into plates 81 and 88 so that element 31 may rotate about their vertical axis. Hydraulic cylinder 19 is activated by time delay switch 65 in response to frames 52 and 57 being at the first level, causing piston rod 91 to extend from that retracted first position shown in FIG. 15 to that extended second position shown in FIG. 16. Retraction of piston rod 92 from that position shown in FIG. 16 to that position shown in FIG. 15 causes the first transfer arms to be moved from its extended (pallet 6 removal) position of FIG. 16 to that retracted position shown in FIG. 15. Extension and retraction of piston rod 92 causes the right hand position of first transfer arms 20 to extend and retract. Such activation is in response to and takes place after a workman releases pedal 78 (stopping the conveyor) then activating pedal 46 to send frames 23 and 26 from their second level (FIG. 4) to their first level (FIG. 3) thus contacting and activating time delay switch 65. Lowering of these frames is achieved by means of a hydraulic cylinder 71 and rack 67 and pinion gear 68 axle 72 and sprocket 68 like that of FIG. 14. The structure and operation of such apparatus has already been shown in connection with elements 100, 71, 70, 69 and 67. Like elements are shown in FIG. 3. For the sake of simplicity, they are not shown in any other Figures relating to station one, but it is to be understood that their presence is necessary at the first station for the operation of the loading apparatus. Frame 23 strikes and activates time delay switch 65. Switch 65 in turn activates a power source (not shown) that activates the fluid in hydraulic cylinder 19.

The right hand portion of first transfer arm 20 at the first station is connected to the left hand portion by means of linkages 86, slot 87, pin 85, arm 83 movably attached to arm 84, arm 84 movably attached to arm 93, arm 93 movably attached by means of slot 96 and pin 95 to arm 82, and arm 82 rotatively attached to arm 20. Thus, through the previously described linkage, movement of the right hand portion of arm 20, the left hand portion of first transfer arm 20 is also moved from that position shown in FIG. 15 to that position shown in FIG. 16. At this position, switch 104 is activated by striker plate 114, the power means (not shown) is reversed and piston rod 92 is retracted from that position shown in FIG. 16 to that position shown in FIG. 15. A viewing of FIGS. 15 and 16 shows the transfer of a pallet 6 at the first station from return conveyor 3 to frame 23, while frame 23 is at the first level. When arms 20 of first transfer arm are retracted time delay switch 60 is activated operating stop member 98.

Figure 19:
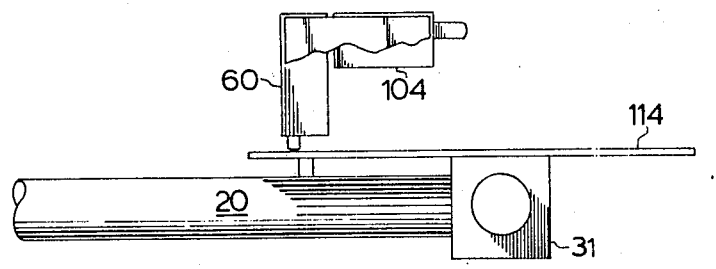
FIGS. 19 and 20 are a partial plan view of a two switchstriker plate transfer arm arrangement employed at the first and third stations.
Figure 20:
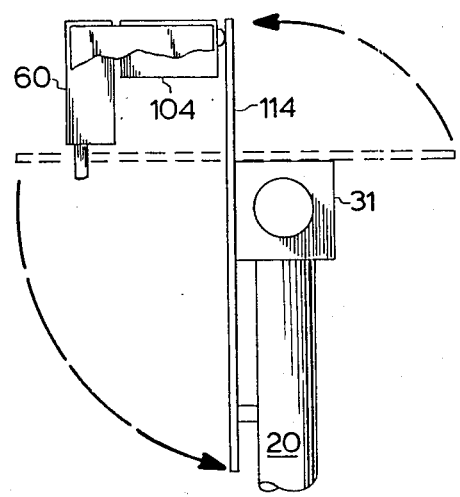

Reference is made to FIGS. 19 and 20 for an understanding of the operation and apparatus of the transfer arms 20 at both the first and third stations. Operation of these elements at the first station will be explained first. After time delay switch 65 is activated, arms 20 go from retracted to their extended position. Striker plate 114 on arm 20 and upright member 31 contacts on-off switch 104 and activates it, sending arms 20 back to their retracted position. In the retracted position, striker plate 114 contacts time delay switch 60, which operates stop member 98, i.e., causes it to retract for a predetermined length of time, enough to allow a single pallet to be fed alongside where frame 23 would be if it were at the first level. After this length of time, time delay switch 60 times out causing stop member 98 to return to its upright (pallet blocking) position as shown in FIG. 16.

In the case of the third station, the operation of the above identified elements is the same, except that time delay switch 60 operates hydraulic cylinder gear system lifter of the third station to raise frame 52 and 57 from the first to the second station. On the other hand, at the first station, depression of pedal 46 operates hydraulic cylinder 71 rack 67 and pinion gear 68, axle 28, sprocket 27 and chain 29, to raise frame 23 from its first (FIG. 3) to its second (FIG. 4) level, as previously described.

Element 82 is a frame member used to delimit guard member 18. Cross members 44 bridge the gap between return conveyor 3 and rack 23 and their upright free edges 113 slope upwardly from left to right forming an upstanding lip in combination with rollers 22 and frame 23. Cross members 44 are "spring loaded" (not shown) so that they will depress when loaded with pallet 6 to the extent that free edge 113 will be flush with the upper most free edge of element 34. Once a pallet 6 is pushed over this lip, it cannot reverse its direction and cause harm to transfer arms 20. Elements 99 are rollers rotatively affixed to upstanding members 20 and provide a rolling surface between transfer arms 20 and pallet 6.

What has been explained in the previous paragraphs is the operation of frame 23 and transfer arms 20 at the first station, to move a pallet 6 from the return conveyor 3 onto frame 23 of the first station when frame 23 is at the first level as shown by FIG. 3. Also explained above is the mechanism and procedure by which the pallet is then raised from level one to level two where pallet 6 comes in contact with the underside of a workpiece 13 yet to be packaged. There yet remains further explanation regarding pallet movement by transfer arms at the third station i.e., the unloading station. For this explanation, reference is made to FIGS. 17, 18, 19 and 20 plus the description above.

Figure 17:
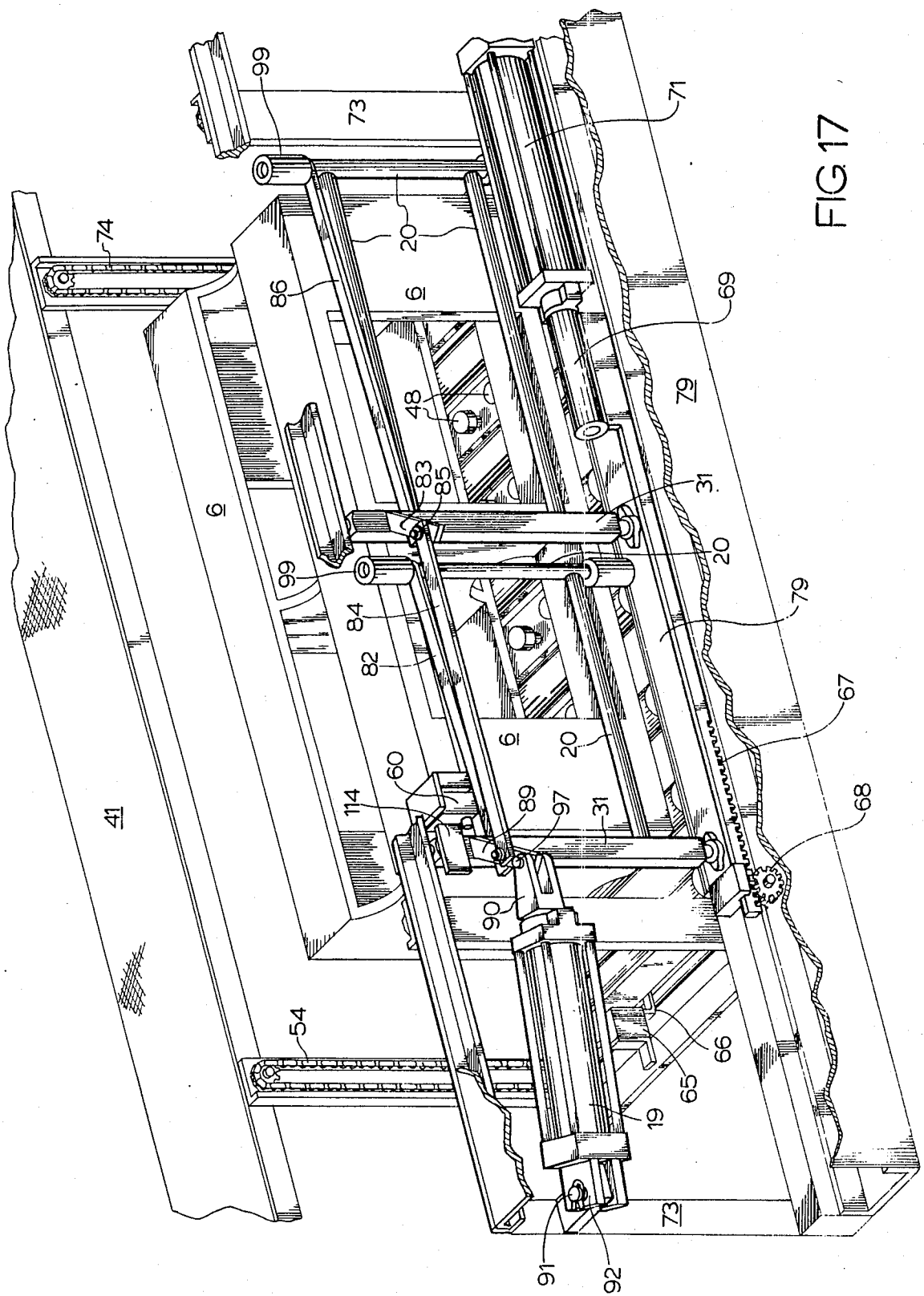
FIGS. 17 and 18 are partial cut-a-way perspective views of the apparatus of the third (unloading) station showing removal of a pallet from a portion of the conveyor system while it is at the second level to the return conveyor.
Figure 18:
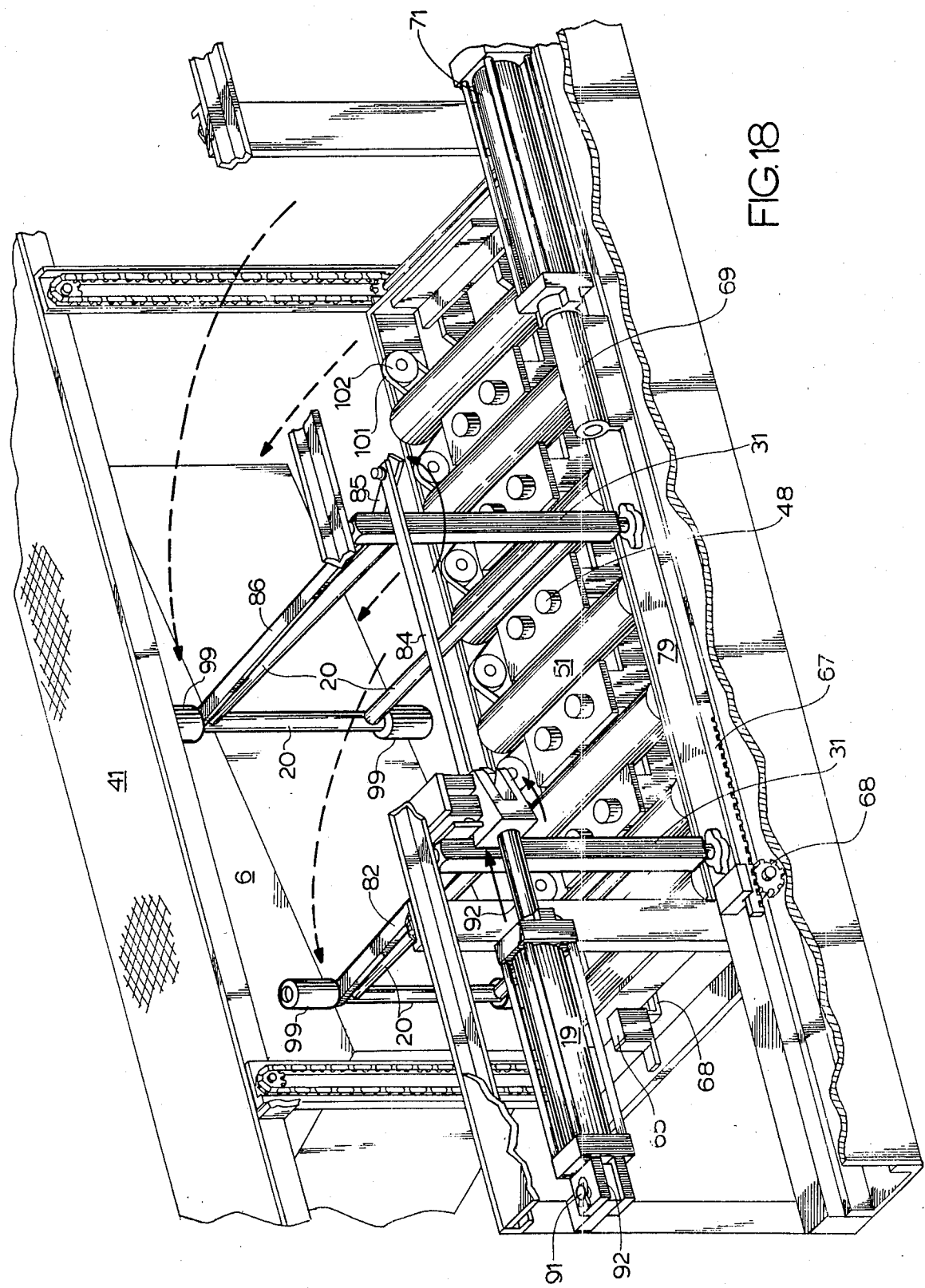

The apparatus shown in FIGS. 17 and 18 should be viewed in combination with and added to the apparatus shown in FIG. 14. FIG. 17 is FIG. 14 viewed from the opposite side of FIG. 14. Three hydraulic systems are present at the third station, i.e., the hydraulic systems of FIGS. 14 and 17 (elements 71 and 14) and hydraulic member 110 of FIGS. 12 and 13. Element 71 raises and lowers frame 52. Element 19 operates transfer arms 20. Element 110 raises and lowers frames 52 and 57. The operation of the first of these hydraulic systems (elements 67, 68, 69 and 71) have already been explained. The other hydraulic system operates rod 92 and consists of hydraulic cyinder 19 rotatively affixed to frame 73 by means of block 103 and pin 91. Hydraulic cylinder 19 has a piston rod 92 and yoke 90, rotatively connected to linkage 89 by pin 97. Linkage 89 is affixably attached to upstanding member 31, which will be remembered is rotatively journaled in base member 79. There are two upstanding members 31, as was in the previously-described case for FIG. 16, both affixed to transfer arms 20. On the terminal portions of the transfer arms 20 are roller means 99, adapted to roll against an outermost surface of pallet 6. Hydraulic cylinder 19 and its associated linkage (previously identified) operate in the same manner as like numbered elements shown and previously described in FIG. 16. Additional linkages in association with the transfer arm 20 of FIG. 17 are those linkages identified as elements 84, 93, and 82. Note also linkage member 86. These also work in the same manner as for like numbered elements as described for FIG. 16 and it is believed that no further description is needed in view of the previous discussion of these parts.

There are two "gates" at stations one and three, each powered by an hydraulic system and each having an upstanding member 31 about which transfer arms 20 pivot. Transfer arms 20, at both the first and third stations, form the operative portion of the "gates", for pushing a pallet from a frame to the return conveyor (third station) or from the return conveyor to a frame (first station) as the use may be. An additional hydraulic system at each station is used to lower a frame, from a second to a first level and to raise the frame from the first to the second level, each such hydraulic system employing an associated rack and pinion gear arrangement as shown in FIGS. 3, 14 and 18. Each hydraulic and gear system operate to raise a frame from level one to level two after the transfer arms have worked their process. At station one, raising and lowering of frame 23 is in response to activation of an on-off switch. At station three, frame 52 is only lowered in response to activation of an on-off switch. Stations one and three each have a time delay switch that is activated by the presence of the respective station frame (23 and 52) being at the first level. When activated, a hydraulic system is powered and extends the station's two gates which activates another switch which retracts the two gates. The respective gates in their retracted position activate still another time delay switch that causes the station's hydraulic rack and pinion gear system to reverse, raising either frame 23 or 52 from level one to level two.

What is claimed is:

1. A method of packaging a workpiece comprising:
   (a) providing a workpiece, a pallet with an uppermost and lowermost surfaces, a conveyor system, and a return conveyor, the conveyor system having a first, second and third stations at a first level and the return conveyor, communicating with the first and third stations for returning pallets from the third to the first station, disposed below at a second level and laterally offset from said conveyor system;
   (b) placing the workpiece on the conveyor system and conveying the workpiece to the first station;
   (c) conveying the pallet laterally from the return conveyor to a position below the workpiece;
   (d) moving the pallet vertically to the first level so that it's uppermost surface is in contact with the workpiece and its lowermost surface is in line with the conveyor system;
   (e) conveying the pallet and workpiece thereon to the second station and packaging the workpiece to create a packaged workpiece; and,
   (f) conveying the packaged workpiece and pallet on the conveyor system to the third station and at such station vertically lowering the pallet from the packaged workpiece and then laterally moving it onto the return conveyor and placing the packaged workpiece on the conveyor system.

2. The method of claim 1 including the further step of conveying the package workpiece from the third station to a predetermined place.

3. The method of claim 1 including the further step of conveying the pallet from the third to the first station on the return conveyor.

4. The method of claim 1 including the step of raising the pallet and workpiece while both are at the first station to a predetermined height above the conveyor system prior to carrying out the step described in subparagraph (e).

5. The method of claim 4 including the step of lowering the pallet and workpiece from said predetermined height prior to carrying out the step described in subparagraph (e).

6. The method of claim 1 wherein steps (c) and (d) comprise the steps of:
   (a) providing a moveable first frame in line with said conveyor system as a part of the first station;
   (b) lowering the moveable frame from the first to the second level;
   (c) laterally removing the pallet from the return conveyor and placing it on the moveable frame; and,
   (d) vertically raising the moveable frame from the second to the first level and in contact with the workpiece so that the work piece rests on the uppermost surface of the pallet.

7. The method of claim 1 wherein removing the pallet from the packaged workpiece at the third station comprises the steps of:
   (a) providing a second moveable frame in line with said conveyor system as a part of the third station;
   (b) placing the pallet with the packaged workpiece disposed on it on the moveable frame;
   (c) vertically lowering the moveable frame and pallet from the first to the second level; and,
   (d) laterally moving the pallet from the moveable frame to the return conveyor.

8. The method of claim 7 wherein coincident with step (c) of claim 7, the packaged workpiece is disposed on said conveyor system.

9. The method of claim 7 wherein the second moveable frame is provided with at least one upstanding roller and the pallet is guided to a predetermined position on the frame at the third station prior to lowering said frame by said upstanding roller.

10. The method of claim 7 wherein the pallet has an aperture in its underside into which the upstanding roller is removably received.

* * * * *